(12) United States Patent
Bells et al.

(10) Patent No.: US 8,232,965 B2
(45) Date of Patent: Jul. 31, 2012

(54) ADJUSTABLE ON-SCREEN CURSOR SENSITIVITY ON A HANDHELD COMMUNICATION DEVICE

(75) Inventors: Matthew Bells, Waterloo (CA); David Mak-Fan, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 815 days.

(21) Appl. No.: 11/422,430

(22) Filed: Jun. 6, 2006

(65) Prior Publication Data
US 2007/0188458 A1 Aug. 16, 2007

Related U.S. Application Data

(60) Provisional application No. 60/773,145, filed on Feb. 13, 2006.

(51) Int. Cl.
*G06F 3/033* (2006.01)
(52) U.S. Cl. .......... 345/159; 345/167; 345/169
(58) Field of Classification Search .......... 345/167–169, 345/160, 156–159
See application file for complete search history.

(56) References Cited

U.S. PATENT DOCUMENTS

| | | | | |
|---|---|---|---|---|
| 5,488,392 A * | 1/1996 | Harris | | 345/157 |
| 5,598,183 A * | 1/1997 | Robertson et al. | | 715/856 |
| 5,748,185 A * | 5/1998 | Stephan et al. | | 345/173 |
| 6,052,115 A | 4/2000 | Gregg et al. | | |
| 6,487,396 B1 * | 11/2002 | Sassi | | 455/90.1 |
| 6,683,627 B1 | 1/2004 | Ullmann et al. | | |
| 6,726,106 B1 | 4/2004 | Han et al. | | |
| 2003/0081016 A1 | 5/2003 | Rahimzadeh et al. | | |
| 2004/0021676 A1 * | 2/2004 | Chen et al. | | 345/684 |
| 2004/0140951 A1 * | 7/2004 | Blish et al. | | 345/163 |
| 2004/0164963 A1 * | 8/2004 | Ono et al. | | 345/167 |
| 2004/0198249 A1 * | 10/2004 | Grifffin | | 455/90.3 |
| 2004/0239533 A1 | 12/2004 | Bollman | | |
| 2005/0190083 A1 | 9/2005 | Tyneski et al. | | |
| 2005/0219209 A1 * | 10/2005 | Fleck et al. | | 345/157 |
| 2006/0007140 A1 * | 1/2006 | Suzuki | | 345/157 |

FOREIGN PATENT DOCUMENTS

| | | |
|---|---|---|
| EP | 0631223 A1 | 12/1994 |
| EP | 1357510 A | 10/2003 |
| JP | 2000148350 A | 5/2000 |

OTHER PUBLICATIONS

European Search report for European Patent Application No. 07102312.1, dated May 23, 2007.

(Continued)

*Primary Examiner* — Amr Awad
*Assistant Examiner* — Kenneth Bukowski
(74) *Attorney, Agent, or Firm* — Jose Gutman; Fleit Gibbons Gutman Bongini & Bianco PL

(57) ABSTRACT

Method and arrangement for adjusting sensitivity in the horizontal and/or vertical directions for the motion of a cursor on the display of a handheld electronic device incorporates a navigation tool as a user input device. The sensitivity can be user-defined, program-defined or a combination of the two. The sensitivity adjustment allows for special properties associated with dimensions of the display and/or with the navigation tool.

26 Claims, 12 Drawing Sheets

OTHER PUBLICATIONS

European Search report for European Patent Application No. 07102311.3, dated May 30, 2007.
European Search report for European Patent Application No. 07102313.9, dated May 31, 2007.
European Search report for European Patent Application No. 07102317.0, dated Jun. 5, 2007.
Sony, "Operating Instructions CMD C1 passage," Sony Operating Instructions CCMD-C1, 1998.

* cited by examiner

```
Message Status: Opened
Sent: Feb 22, 2006 4:35 PM
From: BlackBerry
Subject: Top 10 Phone Tips
1. To open the phone, press the Phone
   button or press the Space key.

2. To end a call, hold the Escape button.

3. To dial a phone number from the
```

ADJUSTABLE ON-SCREEN CURSOR SENSITIVITY ON A HANDHELD COMMUNICATION DEVICE

CROSS-REFERENCE TO RELATED APPLICATIONS

The present application claims the benefit of U.S. Provisional Application No. 60/773,145 filed Feb. 13, 2006. Said application is expressly incorporated herein by reference in its entirety.

FIELD

This disclosure relates to a system and method for varying sensitivity of the motion of a cursor on the display screen of a handheld electronic device. Furthermore, the disclosure describes a system and method that can be utilized to adjust cursor movement sensitivity based upon user preference or the application that is running and/or the display screen the user is navigating.

BACKGROUND

With the advent of more robust wireless communications systems, compatible handheld communication devices are becoming more prevalent, as well as advanced. Where in the past such handheld devices typically accommodated either voice (cell phones) or text transmission (pagers and PDAs), today's consumer often demands a combination device capable of performing both types of transmissions, including sending and receiving e-mail. The suppliers of such mobile communication devices and underlying service providers are anxious to meet these demands, but the combination of voice and textual messaging, as well as other functionalities such as those found in PDAs, have caused designers to have to improve the means by which information is input into the devices by the user, as well as provide better facilitation for the user to navigate within the menus and icon presentations necessary for efficient user interface with these more complicated devices.

For many reasons, screen icons are often utilized in such handheld communication devices as a way to allow users to make feature and/or function selections. Among other reasons, users are accustomed to such icon representations for function selection. A prime example is the personal computer "desktop" presented by Microsoft's Windows® operating system. Because of the penetration of such programs into the user markets, most electronics users are familiar with what has basically become a convention of icon-based functionality selections. Even with many icons presented on a personal computer's "desktop", however, user navigation and selection among the different icons is easily accomplished utilizing a conventional mouse and employing the point-and-click methodology. The absence of such a mouse from these handheld wireless communication devices, however, has necessitated that mouse substitutes be developed for navigational purposes. Mouse-type functionalities are needed for navigating and selecting screen icons, for navigating and selecting menu choices in "drop down" type menus and also for just moving a "pointer" type cursor across the display screen.

Typically, handheld electronic devices have been provided with a navigation tool for movement among the several available menus. The navigation tool also typically has the ability to direct the cursor movement on the screen of the device or scroll through a page viewed on the device.

Today, such mouse substitutes take the form of rotatable thumb wheels, joysticks, touchpads, four-way cursors and the like. In the present description, a trackball is also disclosed as a screen navigational tool. Since the trackball freely rotates within a receiving socket, the user is able to control the rate of rotation and desired direction of rotation of the trackball. This ability provides the user with a different feel for navigation within programs as compared to other navigational devices. This behavior creates an increased need for varying sensitivity; i.e., the amount of cursor movement induced by a particular amount of movement of the rollerball. For example, the range of motion of the cursor to navigate between icons on a home screen is much less than the range of motion required in scrolling through a lengthy email message.

BRIEF DESCRIPTION OF THE DRAWINGS

Exemplary methods and arrangements conducted and configured according to the advantageous solutions presented herein are depicted in the accompanying drawings wherein:

FIG. 1b depicts a home screen of a handheld electronic device that is more narrow than that of FIG. 1a;

FIG. 8 illustrates an exemplary Dvorak keyboard layout;

FIG. 9 illustrates a QWERTY keyboard layout paired with a traditional ten-key keyboard;

FIG. 10 illustrates ten digits comprising the numerals 0-9 arranged as on a telephone keypad, including the * and # astride the zero;

FIG. 11 illustrates a numeric phone key arrangement according to the ITU Standard E.161 including both numerals and letters;

DETAILED DESCRIPTION

This disclosure concerns methods and arrangements for adjusting the sensitivity of on-screen cursor movement in response to user actuation of a navigation tool, preferably in the form of a trackball-based navigation tool. The navigation tool enables a user to navigate the screen view on the handheld electronic device. While the disclosure below is often couched in terms of a trackball, the concept can also be applied to other navigational tools such as trackwheels, touchpads, joysticks, and 4-way navigation pads.

One typical way in which on-screen navigation can be described is in relation to a cursor. The motion of the navigation tool 328 commands a cursor to move on the display screen 322 of a handheld electronic device 300. While "cursor" movement is referred to herein, it shall be appreciated that any resultant motion that is directed by the navigation tool 328 is contemplated. Other such motions include but are not limited to scrolling down through a view on a webpage and scrolling through menu options. It should be appreciated that all such types of navigational motion on the display screen 322 is exemplarily described herein in terms of a cursor's (such as a pointing arrow) movement across a display screen 322; however, those persons skilled in the art will also appreciate that "cursor" movement or navigation on a screen can also be descriptive of successively highlighting presented menu items, screen icons and the like.

As used herein, the term handheld electronic device describes a relatively small device that is capable of being held in a user's hand. It is a broader term that includes devices that are further classified as handheld communication devices, which interact with a communications network.

Figure 18:
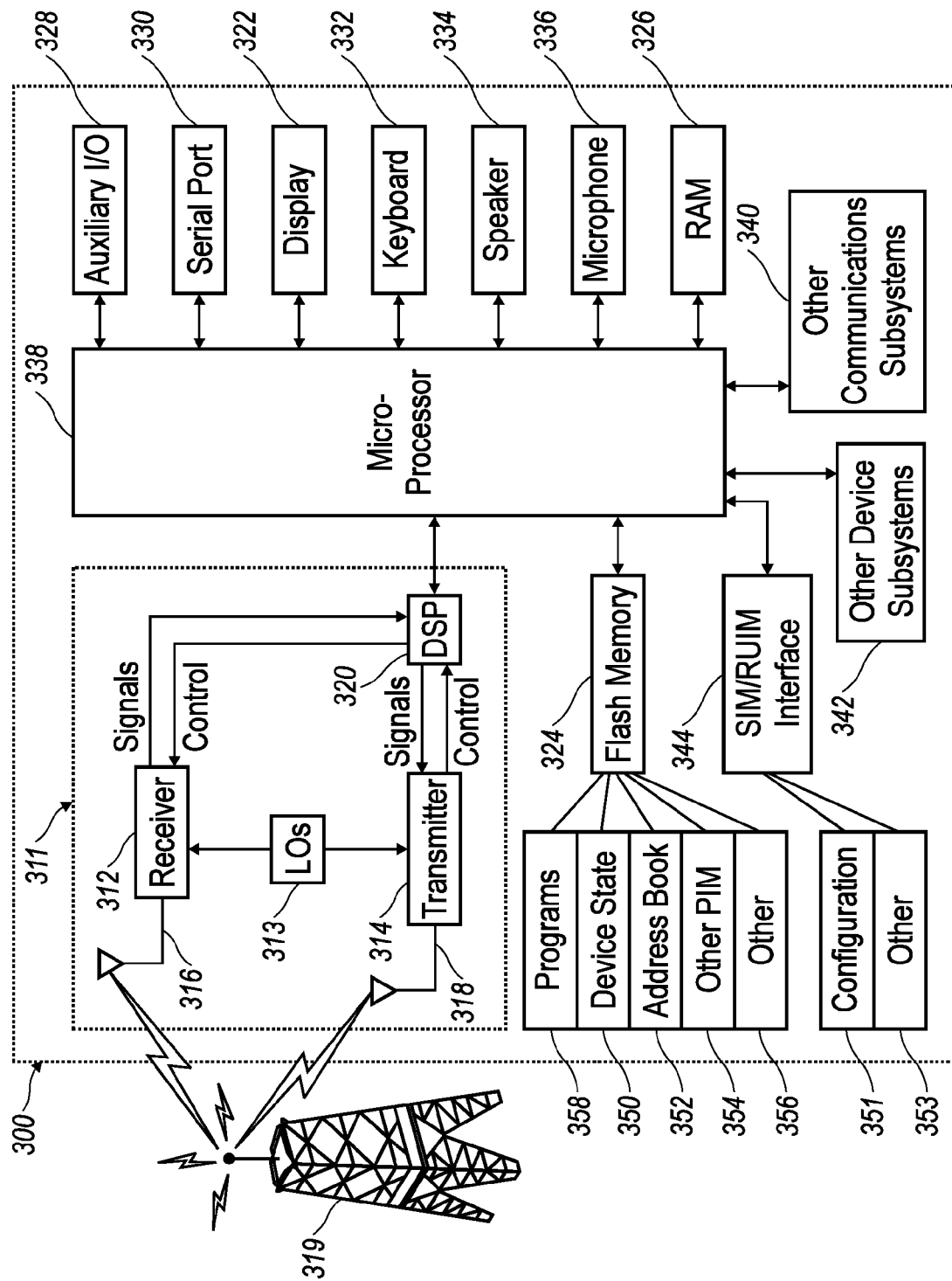
FIG. 18 is a block diagram representing a wireless handheld communication device interacting in a communication network.

As depicted in FIG. 18, the handheld communication device 300 transmits data to, and receives data from a communication network 319 utilizing radio frequency signals, the details of which are discussed more fully hereinbelow. Preferably, the data transmitted between the handheld communication device 300 and the communication network 319 supports voice and textual messaging, though it is contemplated that the method for producing audible sound is equally applicable to single mode devices; i.e. voice-only devices and text-only devices.

Figure 3A:
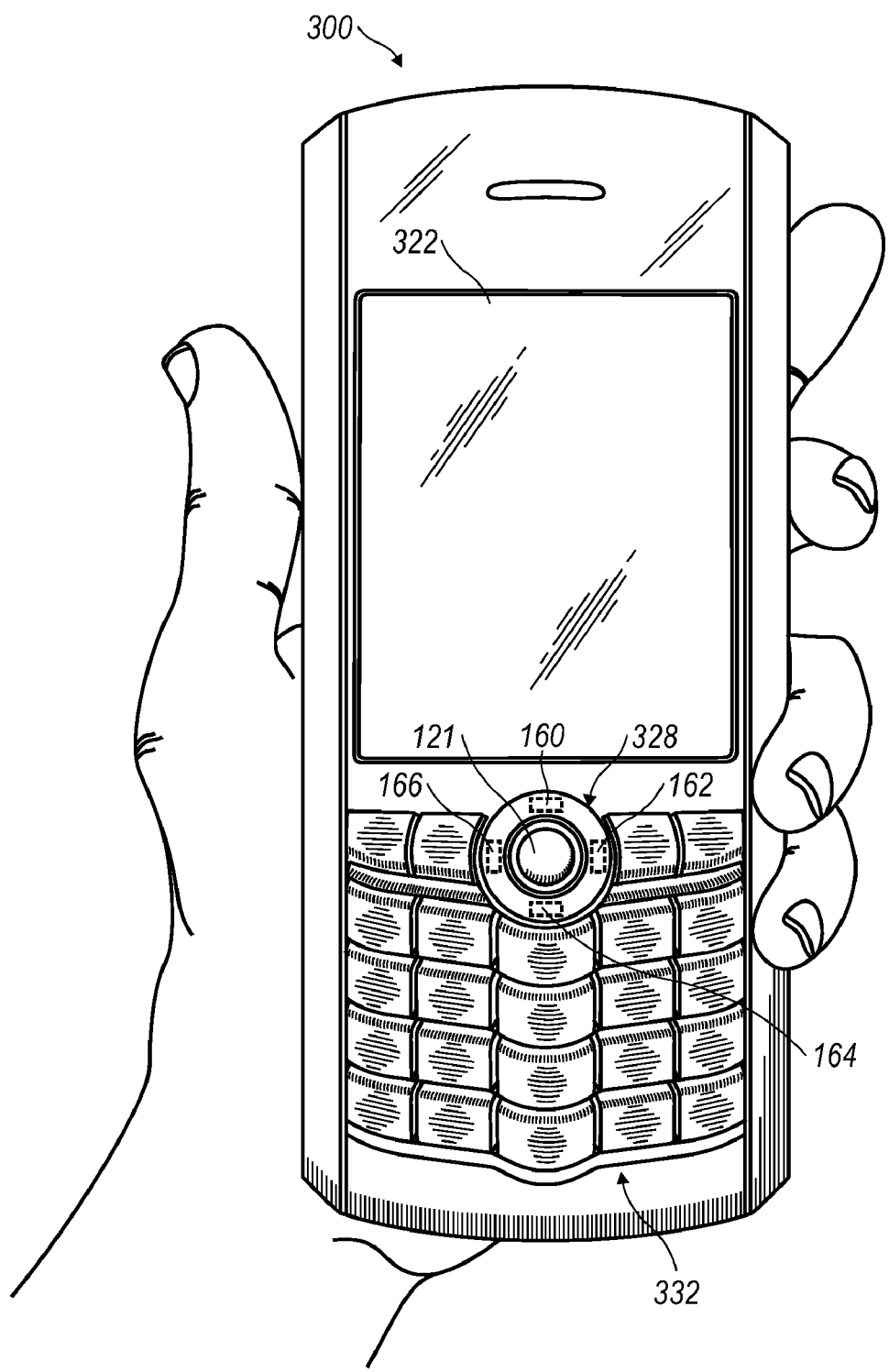
FIG. 3a is a perspective view of a trackball incorporating handheld electronic device cradled in a user's hand.

As may be appreciated from FIG. 3a, the handheld electronic device 300 comprises a lighted display 322 located above a keyboard 332 suitable for accommodating textual input to the handheld electronic device 300 when in an operable configuration. As shown, the device 300 is of unibody construction, but it is also contemplated that the device may be of an alternative construction such as that commonly known as "clamshell" or "flip-phone" style. Regardless, in the operable configuration for the device 300, the navigation tool (auxiliary input) 328 is located essentially between the display 322 and the keyboard 332. The keyboard 332 comprises a plurality of keys with which alphabetic letters are associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

As shown, the auxiliary input is a trackball assembly 328. The ball 121 of the assembly 328 is exposed for user manipulation at an exterior face of the device 300 and is freely rotatable. Motion of the ball 121 is assessed using a plurality of sensors 160, 162, 164, 166 that are positioned adjacent the trackball navigation tool 328 and determine increments of rotation of the ball 121 about a particular axis of rotation. In a preferred embodiment, the sensors 160, 162, 164, 166 quantify rotational motion of the ball 121 about an x-axis 152 and an intersecting y-axis 154 of the trackball (see FIG. 4). The sensors 160, 162, 164, 166 require power to be supplied to detect motion of the ball 121. These sensors 160, 162, 164, 166 further output a cursor control signal based upon the sensed motion of the ball 121. Furthermore, the trackball assembly 328 utilizes a sensor (not shown) to detect depression of the ball 121.

Figure 12:
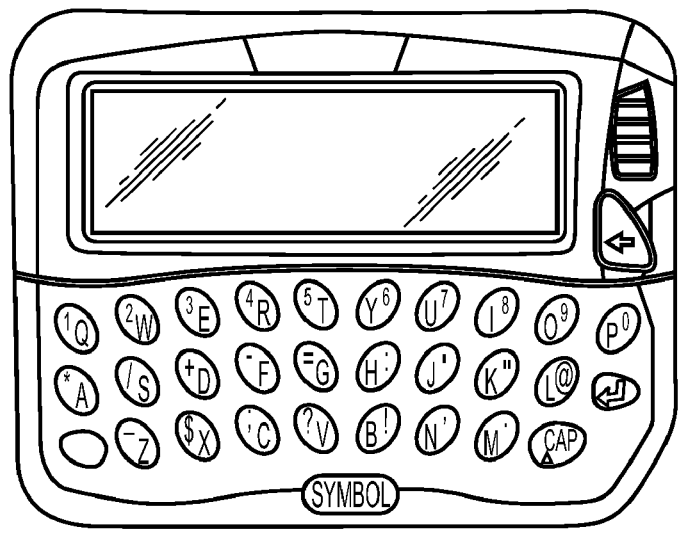
FIG. 12 is a front view of an exemplary handheld electronic device including a full QWERTY keyboard.
Figure 13:
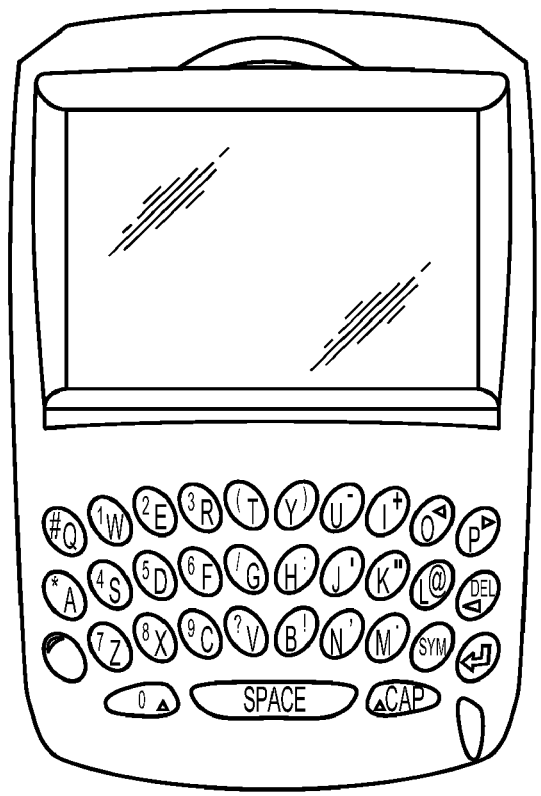
FIG. 13 is a front view of another exemplary handheld electronic device including a full QWERTY keyboard.

In one embodiment, the keyboard 332 comprises a plurality of keys with which alphabetic letters are associated on a one-letter-per-key basis. It is contemplated that the keys may be directly marked with letters, or the letters may be presented adjacent, but clearly in association with a particular key. This one-to-one pairing between the letters and keys is depicted in FIGS. 12 and 13 and is described in greater detail below in association therewith. In order to facilitate user input, the alphabetic letters are preferably configured in a familiar QWERTY, QWERTZ, AZERTY, or Dvorak layout, each of which is also discussed in greater detail hereinbelow.

In the embodiment of FIG. 3a, the keyboard 332 comprises a plurality of keys with which alphabetic letters can be associated, but at least a portion of the individual keys must have multiple letters associated therewith given there are fewer than twenty-six available keys. This type of configuration is referred to as a reduced keyboard (in comparison to the full keyboard described immediately above) {also see FIGS. 14-17} and can, among others come in QWERTY, QWERTZ, AZERTY, and Dvorak layouts.

The navigation tool provided on a handheld 300 can include a tool that is enabled to provide for discrete motion or continuously variable motion. A navigation tool that provides for discrete motion only has an engaged position and disengaged position. The navigation tool that is discrete can have more than one engaged position and typically there are five engaged positions. On-screen navigation for a discrete navigation tool may be adjusted by software to provide a smooth motion of the cursor. Typically this is implemented by engaging and holding the navigation tool in a single position. The software on the handheld electronic device 300 is enabled to interpret this input as either a single engagement or request to move in engaged direction continuously until released. Furthermore, software can control the rate of movement of the cursor on the screen 322 of the device 300 such that the longer the navigation tool is held in the engaged position the faster the cursor moves.

A continuously variable device is one in which the position or location of the navigation tool provides a variable output signal. This signal indicates the amount of engagement in a desired direction. This continuously variable output allows for changes in speed and other variable movement including rapidly changing directions and moving in any direction. The navigation tool as described herein is one that makes use of discrete movement, continuously variable movement, and/or combinations thereof.

In a preferred embodiment, a trackball navigation tool 328 is implemented. The ball 121 rests in a socket as previously mentioned. Since the ball 121 is freely rotatable, the user of a trackball may change the direction of rotation, as well as the rate of rotation.

The sensitivity of the motion of the on-screen cursor can be controlled through signal processing or similar software related control. The ability to adjust the sensitivity of the ball 121 allows the user to experience a more enjoyable user interface. In some situations or program areas of a handheld electronic device 300 it is desirable to have a very sensitive trackball cursor-control routine. An example of this situation is where the user is using a map or picture and prefers a very fine adjustment within the viewing area. The very sensitive trackball cursor-control routine allows the cursor to move at a desired rate which can include pixel-by-pixel motion.

In one exemplary embodiment, the given program will dictate the desired level of sensitivity to be used for trackball motion. In another embodiment, the sensitivity level of the trackball is set by the user. The level of sensitivity can also be set based upon predefined levels. For example, the level of sensitivity for a map feature can be set to high, while the sensitivity for the home navigation-screen can be set to low, while still further, the sensitivity for games can be set to medium. In other embodiments, these levels are individually adjustable and the sensitivity of each level is adjustable as well. In a further embodiment, the level of sensitivity is requested by a given program and the details of the sensitivity for each level are set by the user.

The level of sensitivity allows for adjustment in the user interface. This sensitivity combined with the ability to freely rotate the trackball gives rise to specific navigation control techniques that are not possible with other navigation devices.

Furthermore, the sensitivity can be combined within a specific program to provide an enhanced ease of use. Since the ball 121 is free to rotate, the motion of the ball 121 may not be exclusively left or right, or up or down only. Thus, a control algorithm is used to determine the desired direction of cursor movement. If the direction of rotation is substantially in a rightward fashion, then the cursor will be caused to move in that direction. Furthermore, if there is only slight movement and sensitivity is low there will be no motion of the cursor in response to ball 121 movement.

Figures 2A, 2B:
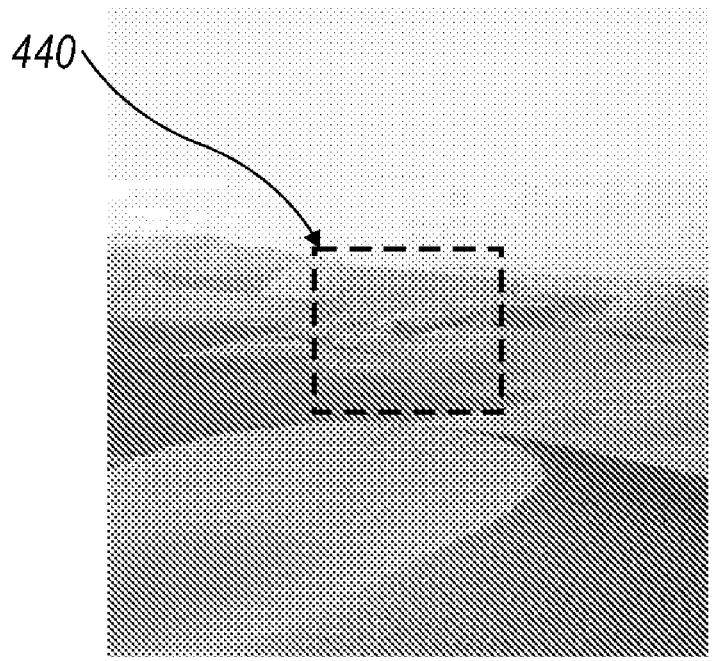
FIG. 2a is a picture navigation view on a handheld electronic device showing a highlighted portion of the picture.
FIG. 2b is an email application view on a handheld electronic device with a cursor highlighted that indicates a particular location within the message.
Figure 3B:
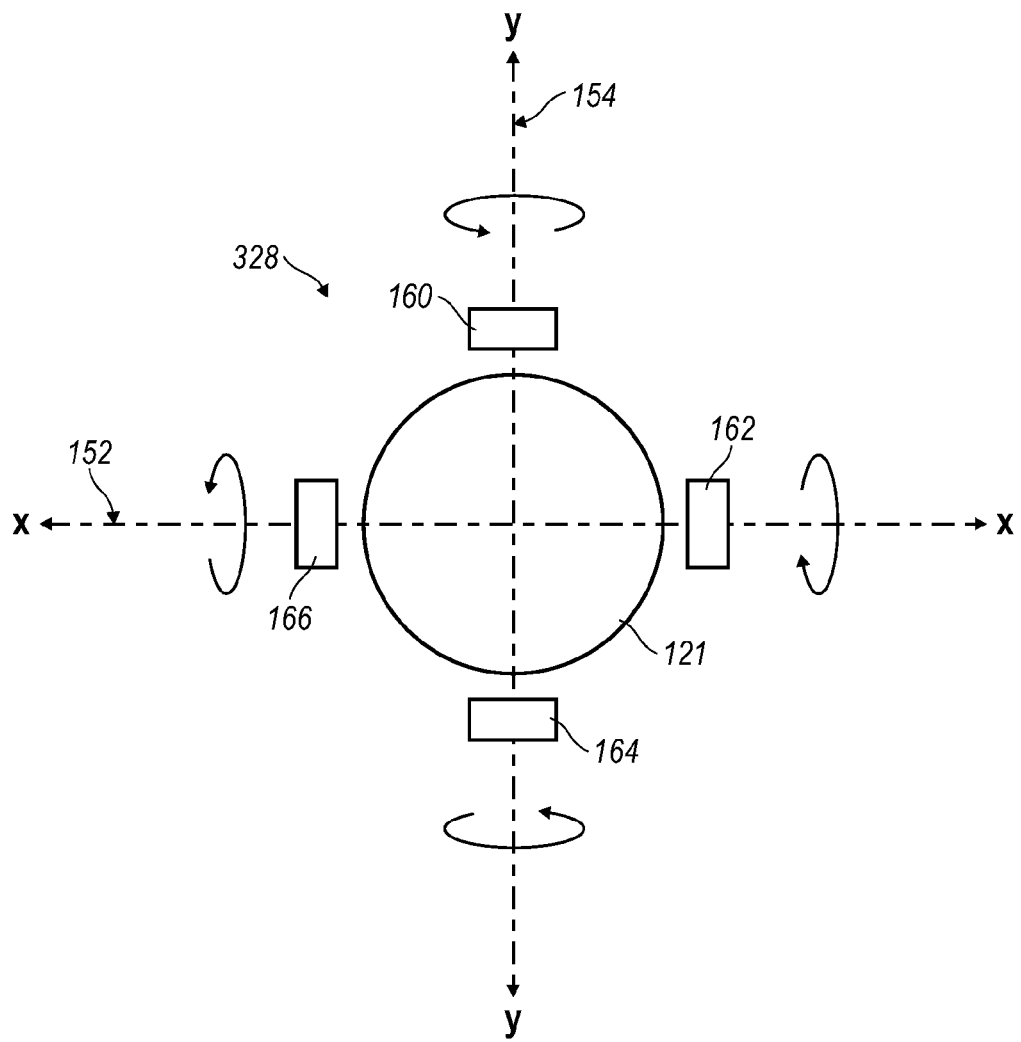
FIG. 3b is a schematic representation of an auxiliary input in the form of a trackball assembly.

In accordance with the teachings of FIGS. 3a and 3b, a handheld electronic device 300 is shown that includes a display 322 on which a cursor can be shown (see FIGS. 1a-2b) and that moves in correspondence with detected rotational movement of a ball 121 in a trackball navigation tool 328 of the device 300. A control program is employed that permits designation of an amount of movement of the cursor to be induced on the display 322 relative to an amount of detected rotational movement of the ball 121 of the trackball navigation tool 328. Those persons skilled in the art will appreciate the particulars of implementing a control program of the nature disclosed herein on a handheld electronic device 300 of the instant nature. Control programs of similar type are routinely employed and well known in the art, and therefore specifics of the implementation are not described in further detail in the present disclosure, but see the description of FIG. 18 regarding more general device programming and supporting electronic structure and components.

In one such aspect, the control program permits the designation of an amount of vertical movement of the cursor to be induced on the display 322 relative to an amount of detected rotational movement of the ball 121 of the trackball navigation tool 328. As depicted in FIG. 3b, the detected rotational movement of the ball 121 is about a horizontal axis 152 of the trackball navigation tool 328 where vertical movement of the cursor is concerned.

In a related aspect, the control program permits the designation of an amount of horizontal movement of the cursor to be induced on the display 322 relative to an amount of detected rotational movement of the ball 121 of the trackball navigation tool 328. As also depicted in FIG. 3b, the detected rotational movement of the ball 121 is about a vertical axis 154 of the trackball navigation tool 328 where horizontal movement of the cursor is concerned.

In a particularly preferred embodiment, the designated amount of induced horizontal cursor movement in comparison to the designated amount of induced vertical cursor movement from the same degree of ball 121 rotation is at least 2:1. This ratio is important based on how a user will normally manipulate a ball 121 of the nature disclosed. As may be best appreciated from the illustration of FIG. 3a, a user will typically use his or her thumb to rotate the ball 121. More particularly, the last joint of the thumb on the hand in which the device 300 is cradled is used. As can be appreciated from FIG. 3a, in order to affect horizontal cursor movement, the thumb will be repeatedly brushed sideways across the ball 121 (left-to-right for movement to the right and right-to-left for movement to the left). Engagement with the ball 121 is across the relatively narrow side surface of the thumb (the side surface of the thumb that is adjacent and generally perpendicular to the thumb nail).

In order to affect vertical cursor movement, the thumb is run up and down across the ball 121. For this manipulation, engagement with the ball 121 is across the relatively long bottom surface of the thumb (the opposite surface of the thumb to the thumb nail). As can be appreciated, if the reaction of the cursor to rotation of the ball 121 is the same in the vertical and horizontal directions, several short sideways brush-strokes of the thumb will have to be affected across the ball 121 in order to induce the same amount of horizontal cursor motion as is induced by one long roll of the ball 121 along the lengthwise direction of the thumb for causing vertical cursor motion.

From this it can be appreciated that at least two short side strokes would be required to induce the same amount of cursor motion as one longer up or down draw of the thumb (i.e., a ratio of 2:1). This in fact is on the low side; a suitable ratio can be on the order of 3:1, 4:1 and even as much as 5:1 based on the user's thumb dimensions.

In view of this background, the present disclosure specifies sensitivity ratios ranging from two to five times with respect to induced horizontal versus vertical cursor travel distances. That is to say, one sideways revolution (about the vertical axis 154) of the ball 121 will produce the same horizontal cursor travel as at least two, and as much as five vertical revolutions (about the horizontal axis 152) of the ball 121, and this accommodation ratio is affected via the control program.

To this end, the control program advantageously permits the designation of a multiplier for each of horizontal and vertical movement of the cursor to be induced on the display 322 relative to an amount of detected rotational movement of the ball 121 of the trackball navigation tool 328.

In one aspect the amount of cursor movement induced on the display 322 relative to the amount of detected rotational movement of the ball 121 of the trackball navigation tool 328 is user adjustable. Exemplarily, this could be based on a user's input via keyboard keys.

In another aspect the amount of movement of the cursor induced on the display 322 relative to the amount of detected rotational movement of the ball 121 of the trackball navigation tool 328 is based on a command instruction received by the control program from an application program running on the handheld electronic device 300. Examples where the command instruction could vary would be between the reading of email messages (an email application is running and issues the sensitivity instruction) versus icon navigation on a home screen (a menu application is running and issues the sensitivity instruction).

In one embodiment, a method for selecting sensitivity of movement on a display 322 of a cursor in response to manipulation of a navigation tool 328 on a handheld electronic device 300 is disclosed. This method includes selecting a horizontal sensitivity and adjusting horizontal movement of the cursor on the display screen of said handheld electronic device 300. It also includes selecting a vertical sensitivity, which adjusts vertical movement of the cursor on the display screen 322 of the handheld electronic device 300.

In another embodiment, a method for adjusting cursor movement on a display of a handheld electronic device 300 includes defining a vertical sensitivity that adjusts the motion of a cursor on a display 322 in relation to activation of a navigational tool 328 in the vertical direction, defining a horizontal sensitivity that adjusts the motion of the cursor on the display in relation to activation of the navigational tool 328 in the horizontal direction, and adjusting the vertical and horizontal sensitivity in response to a sensitivity defining program.

In yet another embodiment, a handheld electronic device 300 includes a navigational tool 328, a display 322 on which a cursor is shown that moves in correspondence with motion of the navigation tool 328, and a program that accommodates adjustment of motion of the cursor on the display 322 in a vertical direction and horizontal direction in response to activation of the navigational tool 328 in the respective direction.

By allowing sensitivity to be adjustable, it is possible to increase the usability of a navigation tool. The adjustment provides for increased sensitivity when moving in different directions and within certain programs. For example, navigation on the home screen or application selection menu of a handheld electronic device requires a coarse movement, see FIGS. 1a and 1b. It is typical that only a few items are selectable on this screen. In contrast a camera or picture viewing application requires fine detailed movement, see FIG. 2a. The selection of a portion of the picture 440 or panning in the camera mode are a few examples of such movement. Another situation that would require fine movement could be navigation of a display screen of a map. Other situations in which coarse, fine, or normal sensitivities are well known in the art.

In a preferred embodiment, the method for selecting sensitivity for on-screen motion of the cursor is adaptable in both a horizontal and vertical direction. The navigational tool 328, preferably a ball 121 as shown in FIG. 3a, is capable of producing signals to direct the motion of the cursor on the display screen 322 of a handheld electronic device 300. Using a ball 121 as an example, the cursor will move left on the display screen 322 of the device 300 when the ball 121 is rolled to the left. Likewise, the cursor will move in a vertical direction when the ball 121 is rotated in a vertical orientation in relation to the screen 322. In an exemplary embodiment as shown in FIG. 2b, the navigation is illustrated in relation to viewing an email message. Here, the cursor 450 is over the letter "b." A vertical motion would move the cursor 450 over the number "1." If the ball 121 is rotated to the right then the cursor 450 will be moved over to the letter "u." This range of motion allows the user to select text among other options in addition to scrolling through the text.

Figure 1A:
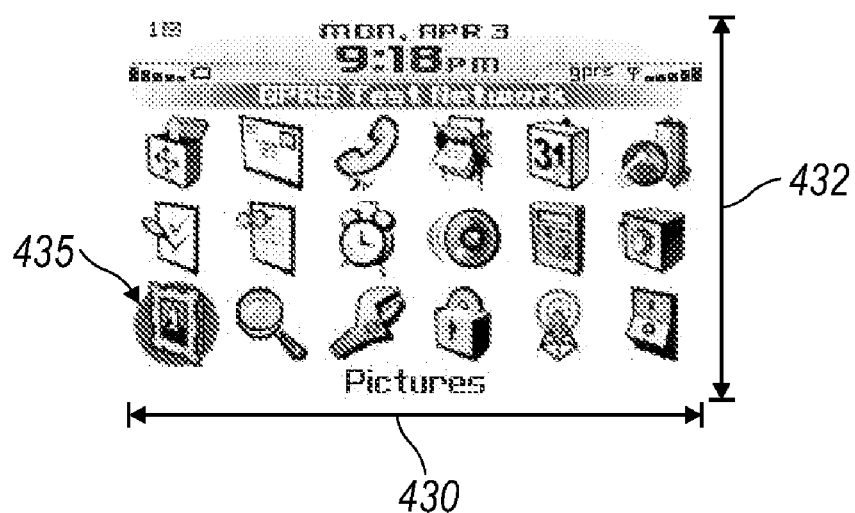
FIG. 1a depicts a home screen of a handheld electronic device.
Figure 1B:
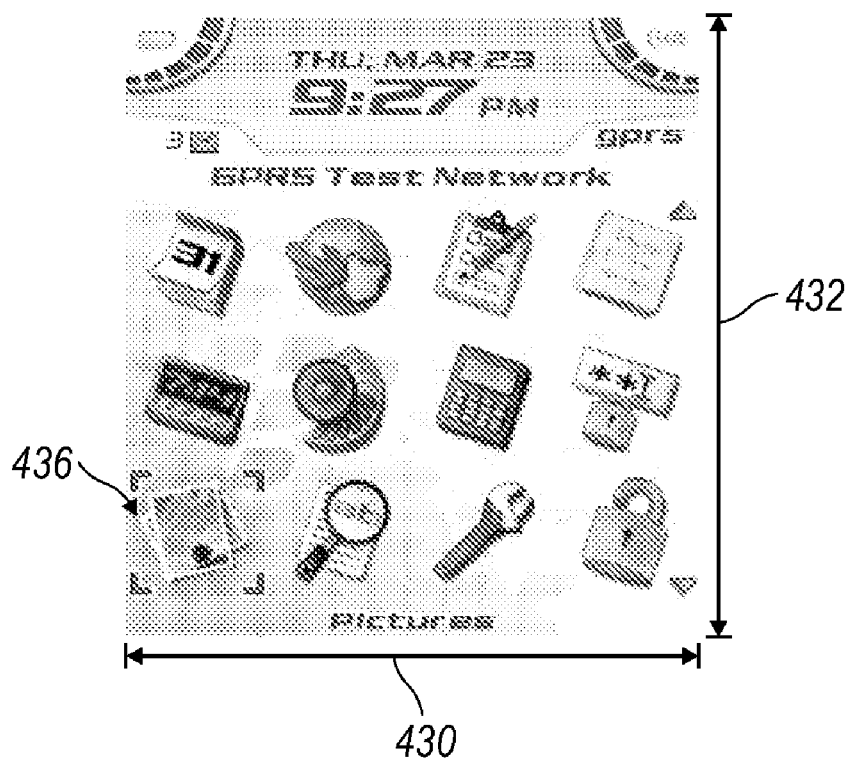

The sensitivity levels control the rate of motion of the on-screen cursor/high lighter in relation to the actuated movement of the navigation tool 328. When using a navigation tool 328, the range of motion that a cursor needs to traverse in different applications can vary in response to the actuation of the navigation tool 328. One illustrative example of the range of motion that a cursor might be requested to traverse is shown in FIG. 1a. In this example, the cursor 435 can be requested to move in a horizontal direction five steps and two steps in the vertical direction. Similarly in a screen with different dimensions as shown in FIG. 1b, only three steps are allowed in the horizontal direction. In this situation, the number of icons is more numerous than the screen can show at one time and the cursor 436 is enabled to scroll beyond what is shown at any given time on the display screen 322. However, as shown in FIG. 2b, that particular display requires thirty-five (35) actuations if only discrete moves are made across the display horizontally.

In a typical email or other application that features text shown on the display, the number of motions required to move the cursor in discrete steps is larger than navigation among icons on, for instance, a home screen. While some navigation tools might require 35 depressions to navigate across, others may use software to implement a scrolling feature. Thus slight movement will move the cursor rapidly across the screen shown in FIG. 1a, but only a few characters across in FIG. 2b. Thus, modifying the sensitivity of the rate of movement in vertical and horizontal direction of the cursor on the display screen is desirable.

In one embodiment, the user is capable of defining the horizontal and/or vertical sensitivity. In another embodiment, the sensitivity is adjusted in response to the program that is currently operating on the handheld electronic device 328. Among other reasons why it is desirable to adjust the sensitivity is that the vertical 432 and horizontal dimensions 430 of the display screen in some handheld electronic devices are of different dimensions (see FIGS. 1a and 1b). Thus, for some devices the width 430 of the display is wider than the height 432 of the display, as shown in FIG. 1a, and others the height 432 of the display is greater than the width 430 of the display, as shown in FIG. 1b. Yet other displays have a height that is equal to the width of the display. As shown in FIG. 1a, navigation of displays in which the dimensions of the width 430 of the screen is greater than the height 432 of the screen present one example. If the sensitivity levels are identical, activation of the navigation tool 328 for the same period will lead to cursor being able to traverse to the top of the display, but falling short of the horizontal edge of the display 322 if the starting point is on the opposing edge in both instances. In a preferred embodiment, the horizontal and vertical sensitivities allow for the same motion only in different directions to produce a motion of the cursor such that it traverses the display 322 in the same direction as navigation tool is actuated.

The sensitivity of movement on the display 322 of the cursor in response to manipulation of the navigation tool 328 can be set by a variety of different programs. In addition to user-defined settings for sensitivity levels, a program such as the email program can set new sensitivity levels for navigation of the cursor on the screen 322 that is displayed while that particular program is running. In a preferred embodiment, the program scales previously set user user-defined settings to levels that the program has set. In another embodiment, the user-defined settings are always reset according to the program without regard to previously set user-defined settings. In a still further embodiment, the sensitivity levels are reset from default sensitivity levels only if no user-defined settings have been implemented. Alternatively, if there is no ability to set user-defined settings for sensitivity levels, the program will set the sensitivity levels according to preset guidelines. In another embodiment, the program itself may allow for user-defined settings.

Furthermore, a sound is generated when the cursor traverses the display 322. As the sensitivity is changed the sound generated provides the user a sense of the motion of the cursor on the screen 322 as it relates to the actuation of the navigation tool 328. This sound is helpful when the navigation tool 328 is one in which there is little or no tactile feedback from the actuation of the navigation tool 328.

In yet another embodiment, a handheld device 300 including a navigation tool 328, display 322 and programs are provided. The display 322 is capable of showing motion of a cursor. One of the programs that are provided on the device 300 or downloadable to the device 300 accommodates adjustment of motion of the cursor on the display 322 in a vertical direction and horizontal direction. The downloading of the software can take a form that is known in the art including but not limited to downloading over a wireless network, over a serial port connection, infrared connection, or the like. The program as mentioned above is capable of modifying the sensitivity either using predefined settings or allowing a user to modify the settings.

In a preferred embodiment, the navigation tool 328 is a ball 121. The ball 121 is designed to be manipulated by one finger or thumb. Preferably, the location of the ball 121 is centered on the device 300 allowing for ambidextrous usage. In actuation of the ball 121, the user's fingers or thumbs are of different dimensions in length and width. Thus, if the user's thumb is held such that it points to the top of the device 300 the vertical dimension is the length and the horizontal the width. Thus, the width is smaller than length. When using the ball 121 the length is capable of a longer actuation of the ball 121 as compared to the width. Thus, it is desirable to adjust the sensitivity to accommodate this difference.

The handheld communication device 300 comprises a radio transmitter 318 capable of transmitting data to a communication network 319 utilizing radio frequency signals and a radio receiver 312 capable of receiving data from the communication network 319 utilizing radio frequency signals.

Further aspects of the environments, devices and methods of employment described hereinabove are expanded upon in the following details. An exemplary embodiment of the handheld electronic device as shown in FIG. 3a is cradleable in the palm of a user's hand. The size of the device is such that a user is capable of operating the device using the same hand that is holding the device. In a preferred embodiment, the user is capable of actuating all features of the device using the thumb of the cradling hand. While in other embodiments, features may require the use of more than just the thumb of the cradling hand. The preferred embodiment of the handheld device features a keyboard on the face of the device, which is actuable by the thumb of the hand cradling the device. The user may also hold the device in such a manner to enable two thumb typing on the device. Furthermore, the user may use fingers rather than thumbs to actuate the keys on the device. In order to accommodate palm-cradling of the device by the average person, it is longer (height as shown in FIG. 3a) than it is wide, and the width is preferably between approximately fifty and seventy-six millimeters (two and three inches), but by no means limited to such dimensions.

The handheld electronic device includes an input portion and an output display portion. The output display portion can be a display screen, such as an LCD or other similar display device.

The input portion includes a plurality of keys that can be of a physical nature such as actuable buttons or they can be of a software nature, typically constituted by virtual representations of physical key on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device is shown on the display screen in the same configuration as the physical keys. Thus, the desired character, command or function is obtained by depressing the physical key corresponding to the character, command or function displayed at a corresponding position on the display screen, rather than touching the display screen. To aid the user, indicia for the characters, commands and/or functions most frequently used are preferably positioned on the physical keys and/or on the area around or between the physical keys. In this manner, the user can more readily associate the correct physical key with the character, command or function displayed on the display screen.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 5:
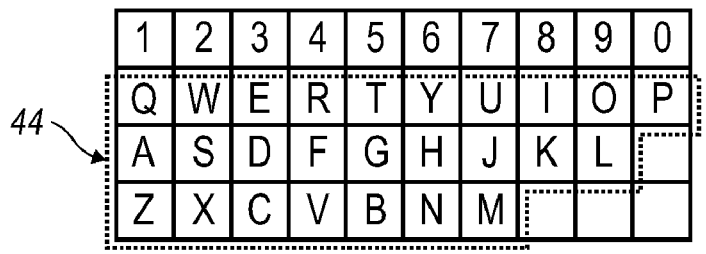
FIG. 5 illustrates an exemplary QWERTY keyboard layout.

The QWERTY keyboard layout is the standard English-language alphabetic key arrangement 44 (see FIG. 5). In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878, U.S. Pat. No. 207,559.

Figure 6:
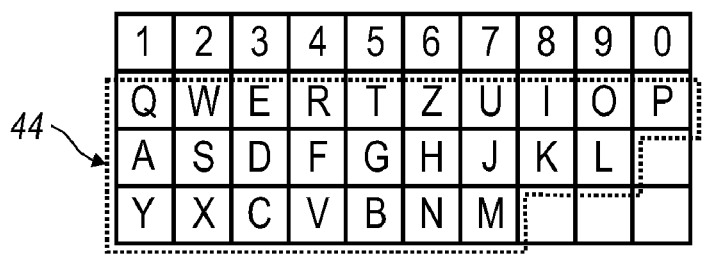
FIG. 6 illustrates an exemplary QWERTZ keyboard layout.

The QWERTZ keyboard layout is normally used in German-speaking regions. This alphabetic key arrangement 44 is shown in FIG. 6. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 7:
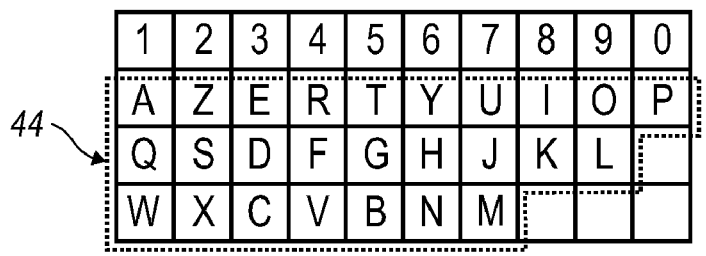
FIG. 7 illustrates an exemplary AZERTY keyboard layout.

The AZERTY keyboard layout is normally used in French-speaking regions. This alphabetic key arrangement 44 is shown in FIG. 7. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 8, 9, 10, 11:
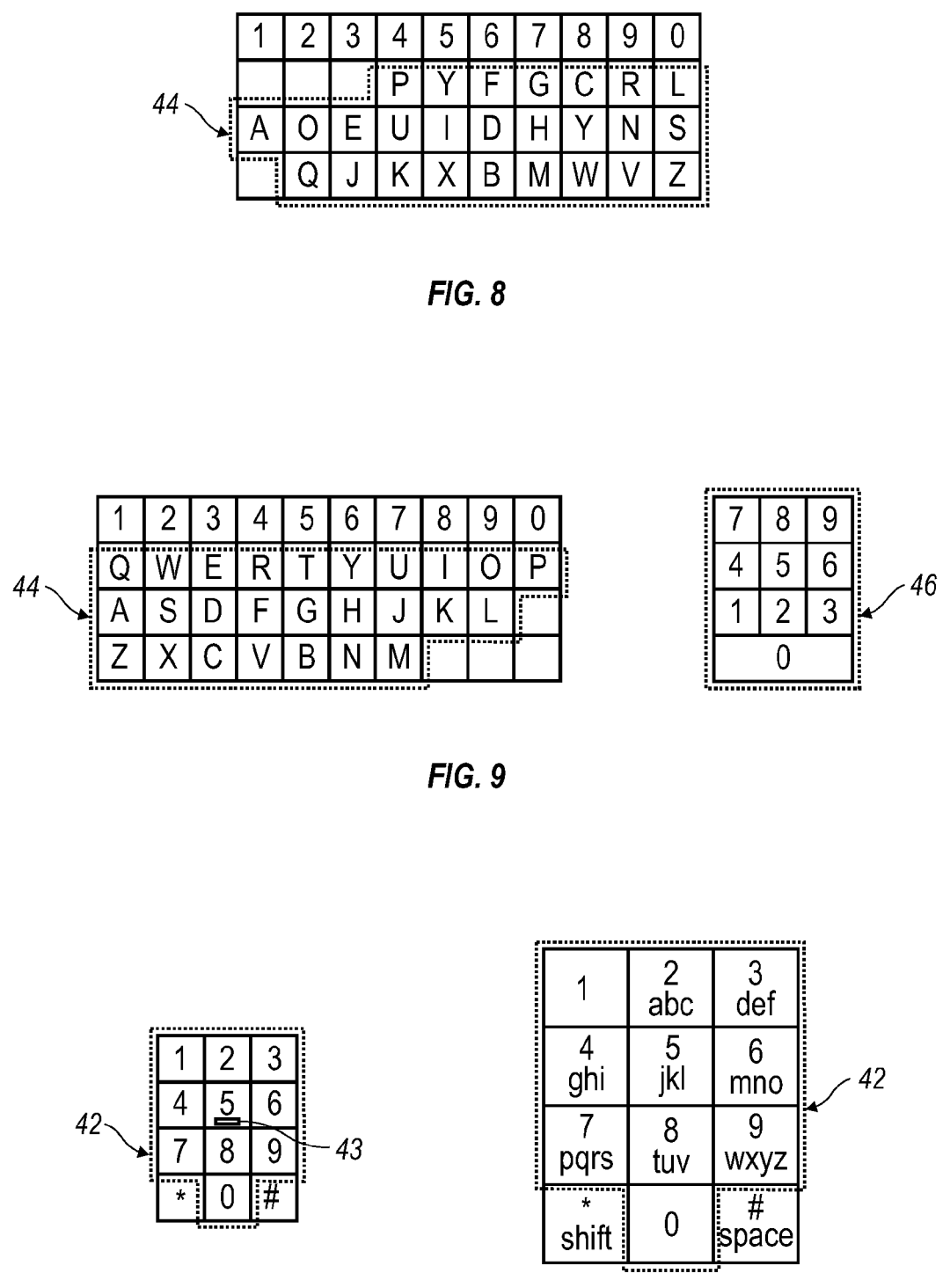

The Dvorak keyboard layout was designed in the 1930s by August Dvorak and William Dealey. This alphabetic key arrangement 44 is shown in FIG. 8. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 5-8 where the numbers 1-9 and 0 are positioned above the alphabetic keys. In another numeric key arrangement, numbers share keys with the alphabetic characters, such as the top row of the QWERTY keyboard. Yet another exemplary numeric key arrangement is shown in FIG. 9, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a "ten-key" computer keyboard keypad. Additionally, a numeric phone key arrangement 42 is shown in FIG. 10.

As shown in FIG. 10, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key.

It is desirable for handheld electronic devices to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone key pads.

In embodiments of a handheld electronic device having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

One device that uses a full keyboard for alphabetic characters and incorporates a combined numeric keyboard is shown in FIG. 12. In this device, numeric characters share keys with alphabetic characters on the top row of the QWERTY keyboard. Another device that incorporates a combined alphabetic/numeric keyboard is shown in FIG. 13. This device utilizes numeric characters in a numeric phone key arrangement consistent with the ITU Standard E.161, as shown in FIG. 10. The numeric characters share keys with alphabetic characters on the left side of the keyboard.

In order to further reduce the size of a handheld electronic device without making the physical keys or software keys too small, some handheld electronic devices use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types handheld electronic device to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage.

The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text-on-nine-keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 14:
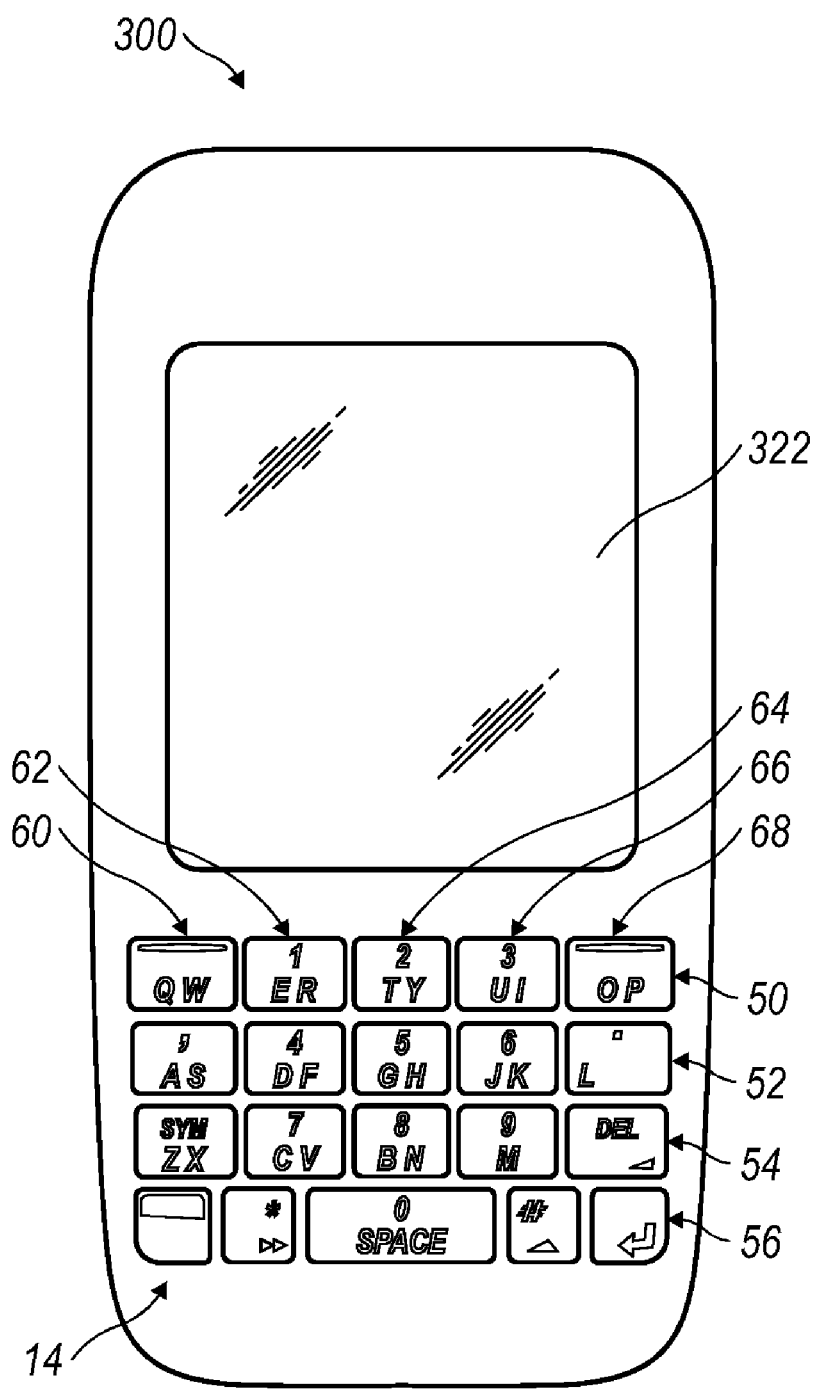
FIG. 14 is a front view of an exemplary handheld electronic device including a reduced QWERTY keyboard.

FIG. 14 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 14. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 300.

Figure 15:
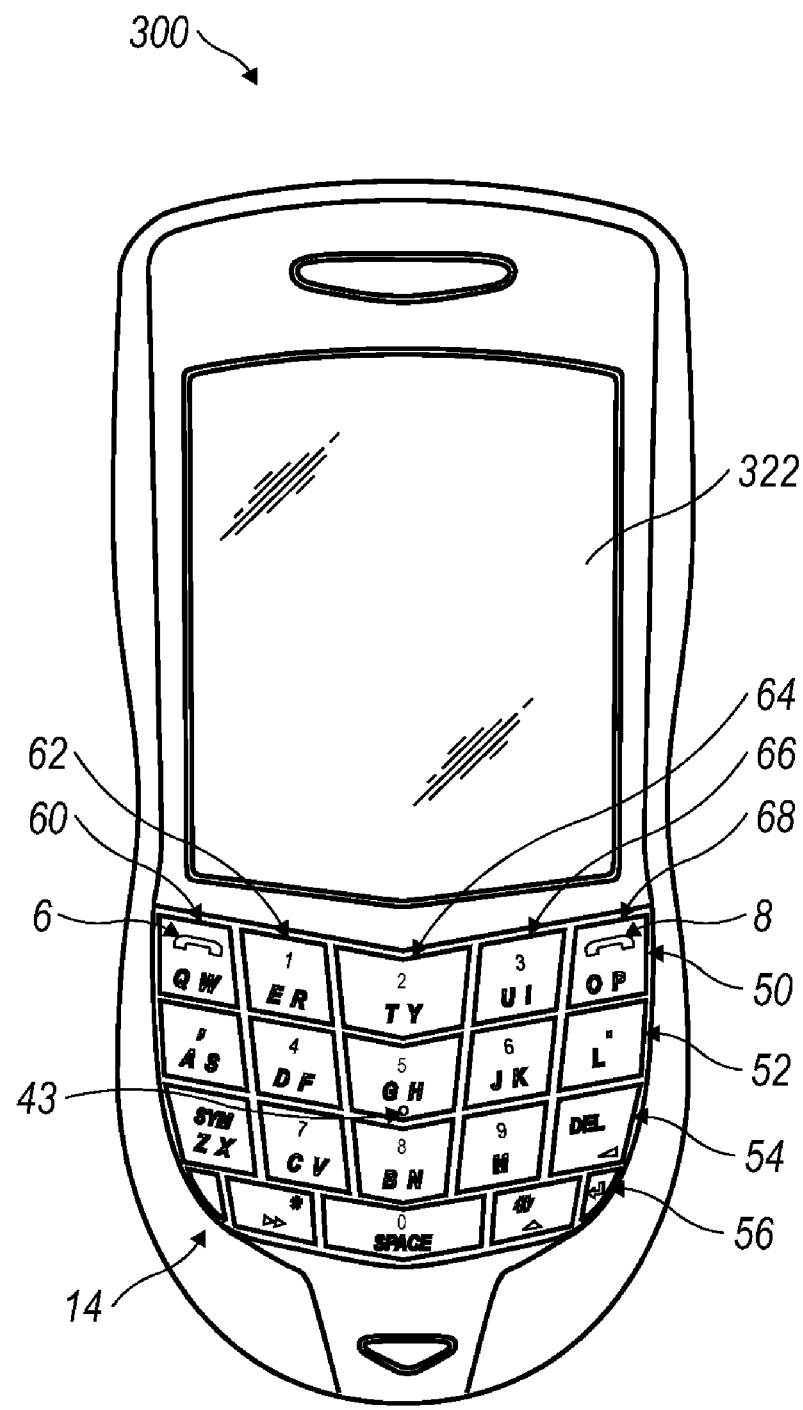
FIG. 15 is an elevational view of the front face of another exemplary handheld electronic device including a reduced QWERTY keyboard.
Figure 16:
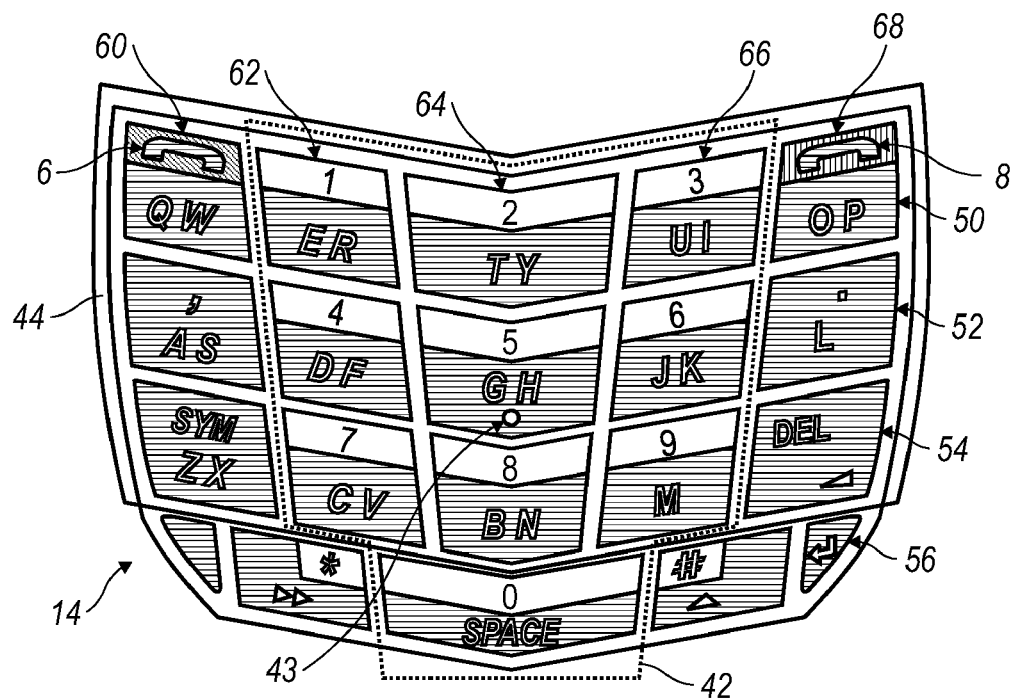
FIG. 16 is a detail view of the reduced QWERTY keyboard of device of FIG. 15.

FIG. 15 shows a handheld electronic device 300 that has an example physical keyboard array of 20 keys, with five columns and four rows. An exploded view of the keyboard is presented in FIG. 16. Fourteen keys on the keyboard 14 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 14 includes a "send" key 6 and an "end" key 8. The "send" key 6 is positioned in the upper left corner of the keyboard 14 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 17:
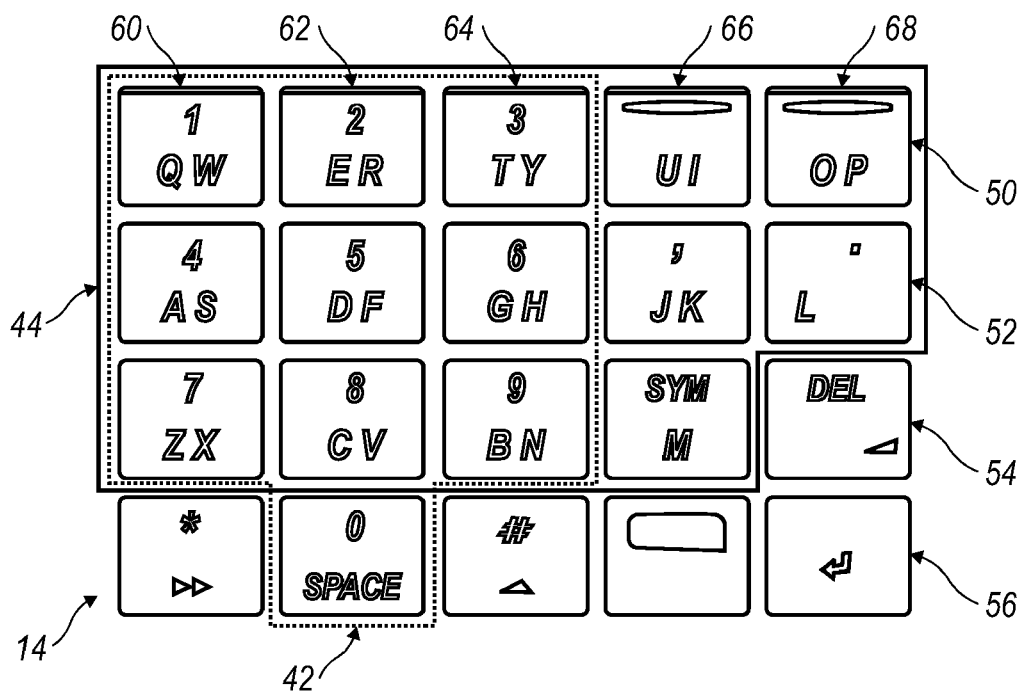
FIG. 17 is a detail view of an alternative reduced QWERTY keyboard.

FIG. 17 shows a similar format for the reduced QWERTY arrangement of alphabetic characters 44 as presented in FIG. 14, but the numeric phone key arrangement 42 is positioned in the first 60, second 62, and third 64 columns instead of being centered on the keyboard 14. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 11. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 10 (no alphabetic letters) and 11 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

|  |  |  |  | Mobile Phone Keypad | |
|---|---|---|---|---|---|
| Number on Key | ITU E.161 | Australia | #1 | #11 (Europe) | #111 (Europe) |
| 1 |  | QZ |  | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ÜVW | VWX |
| 9 | WXYZ | WXY | WXY | XYZ | YZ |
| 0 |  |  | OQZ |  |  |

It should also be appreciated that other alphabetic character and number combinations can be used beyond those identified above when deemed useful to a particular application.

As noted earlier, multi-tap software has been in use for a number of years permitting users to enter text using a conventional telephone key pad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

An exemplary handheld electronic device is shown in the assembly drawing of FIG. 3a and its cooperation in a wireless network is exemplified in the block diagram of FIG. 18. These figures are exemplary only, and those persons skilled in the art will appreciate the additional elements and modifications necessary to make the device work in particular network environments.

Figure 4:
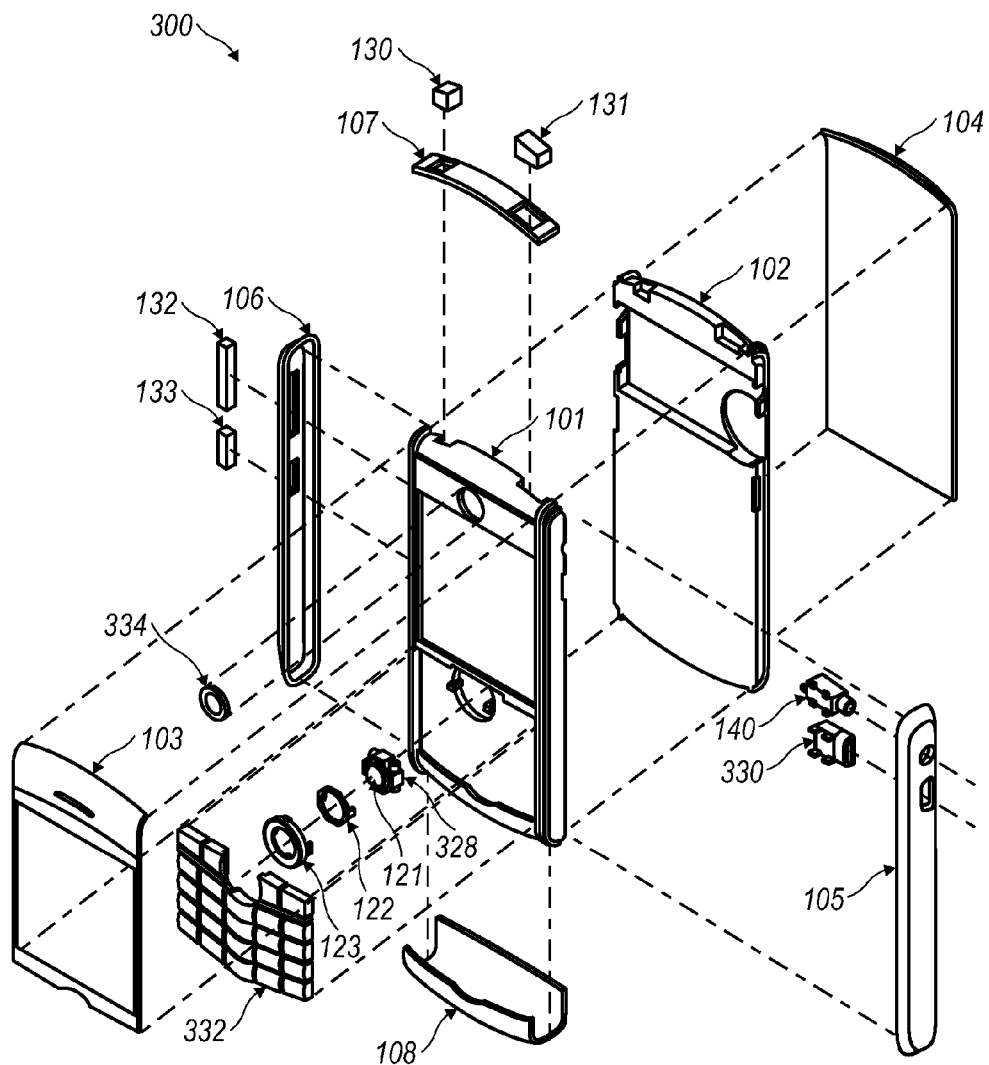
FIG. 4 is an exploded perspective view of an exemplary wireless handheld electronic device incorporating a trackball assembly as the auxiliary input.

FIG. 4 is an exploded view showing some of the typical components found in the assembly of the handheld electronic device. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 3a, the navigation tool 328 is a ball 121 based device. Other navigation tools 328 such as joysticks, four-way cursors, or touch pads are also considered to be within the scope of this disclosure. When the navigation tool 328 has a ball 121, the ball 121 itself can be removed without removal of the navigation tool 328. The removal of the ball 121 is enabled through the use of an outer removable ring 123 and an inner removable ring 122. These rings 122, 123 ensure that the navigation tool 328 and the ball 121 are properly held in place against the support frame 101.

A serial port (preferably a Universal Serial Bus port) 330 and an earphone jack 140 are fixably attached to the PCB 102 and further held in place by right side element 105. Buttons 130-133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 106, 105 provide additional protection and strength to the support structure of the device 300. In a preferred embodiment, backplate 104 is removably attached to the other elements of the device.

The block diagram of FIG. 18 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool 328. As previously mentioned, the navigation tool 328 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld electronic device 300b are considered within the scope of this disclosure.

In a preferred embodiment, the communication device 300 is designed to wirelessly connect with a communication network 319. Some communication networks that the communication device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and data 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrow-band, data-only technologies mainly used for short burst wireless data transfer.

For the systems listed above, the communication device 300 must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. In some locations, the communication device 300 will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

A signal received by the communication device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding both wireless handheld electronic devices, as well as the communication networks within which they cooperate. It should be appreciated, however, that a focus of the present disclosure is the enablement of varying sensitivity of the motion of the cursor on the display screen of a handheld electronic device.

What is claimed is:

1. A handheld electronic device comprising:
    a display on which a cursor is shown and which moves in correspondence with a set of detected rotational movements of a navigation tool of the handheld electronic device;
    at least one application configured to present at least one screen on the display, the cursor being configured to be transitioned within the screen in response to the set of detected rotational movements; and
    a control program configured to permit designation of
        an amount of horizontal movement of the cursor to be induced on the display per a first set of detected movements of the navigation tool in a horizontal direction, and
        an amount of vertical movement of the cursor to be induced on the display per a second set of detected movements of the navigation tool in a vertical direction, the control program being separate and distinct from the at least one application, and
    the at least one application being further configured to set the amount of horizontal movement and the amount of vertical movement induced on the at least one screen of the display presented by the at least one application,
    independent of the amount of horizontal movement and the amount of vertical movement designated through the control program, and
    independent of an amount of horizontal movement and an amount of vertical movement designated through user defined settings,
    for movement of the cursor within the at least one screen presented by the at least one application independent of induced movement of the cursor in other screens associated with other applications.

2. The handheld electronic device as recited in claim 1, where the second set of detected movements of a ball of the navigational tool comprises a set of detected rotational movements of the ball about a horizontal axis of the navigation tool.

3. The handheld electronic device as recited in claim 1, where the first set of detected movements of a ball of the navigational tool comprises a set of detected rotational movements of the ball about a vertical axis of the navigation tool.

4. The handheld electronic device as recited in claim 1, where the amount of horizontal movement and the amount of vertical movement are adjustable.

5. The handheld electronic device as recited in claim 1, further comprising a keyboard suitable for accommodating textual input to the handheld electronic device when the handheld electronic device is in an operable configuration, the navigation tool being located essentially between the display and keyboard in the operable configuration.

6. The handheld electronic device of claim 1, where the at least one application is one of an email application program, a menu selection program, a messaging application, a camera program, and a picture viewing application.

7. The handheld electronic device of claim 1, where the control program permits designation of up to five times as much horizontal movement of the cursor to be induced on the display per the first set of detected movements compared to an amount of vertical movement of the cursor to be induced on the display per the second set of detected movements.

8. The handheld electronic device as recited in claim 1, where the handheld electronic device is capable of receiving data from a communication network utilizing radio frequency signals, and wherein the handheld electronic device includes a downloadable program that is downloadable by the handheld electronic device via the communication network, the downloadable program for at least scaling the designation made by the control program to modify designations of induced movements.

9. The handheld electronic device as recited in claim 3, where the amount of horizontal movement is set where one revolution of the ball about the vertical axis produces a same cursor movement as at least two, and as much as five, revolutions of the ball about the vertical axis.

10. The handheld electronic device of claim 1, where the screen comprises a length that is of a different dimension than a width of the screen, and where a vertical movement of the cursor corresponds to the length of the screen and a horizontal movement of the cursor corresponds to the width of the screen, the at least one application setting the amount of horizontal movement of the cursor and the amount of vertical movement of the cursor where the cursor is configured to traverse the length of the screen and the width of the screen in an equal number of movements.

11. A method for designating sensitivity of movement on a display of a cursor in response to manipulation of a navigation tool on a handheld electronic device comprising:
receiving, by a control program from at least one application that is currently operating and presenting a screen on a display,
an amount of horizontal movement of a cursor to be induced on the screen, independent of induced movement of the cursor in other screens associated with other applications, per a first set of detected movements of a navigation tool in a horizontal direction, and
an amount of vertical movement of the cursor to be induced on the screen, independent of induced movement of the cursor in other screens associated with other applications, per a second set of detected movements of navigation tool in a vertical direction,
the control program being separate and distinct from the at least one application,
the amount of horizontal movement and the amount of vertical movement received from the at least one application being set by the at least one application, independent of an amount of horizontal movement and an amount of vertical movement designated through the control program, and
independent of an amount of horizontal movement and an amount of vertical movement designated through user defined settings; and
adjusting, by the control program, a horizontal movement sensitivity of the cursor and a vertical movement sensitivity of the cursor for the screen in response to receiving the amount of horizontal movement of the cursor and the amount of vertical cursor movement from the at least one application.

12. The method as recited in claim 11, where the navigation tool comprises at least one of a trackball, a navigation pad, a joy stick, and a thumbwheel.

13. The method of claim 11, where the vertical movement sensitivity is set in relation to the horizontal movement sensitivity using a multiplier selected based upon vertical cursor movement and horizontal cursor movement caused by a user.

14. The method of claim 13, where the horizontal movement sensitivity is as much as five times greater than the vertical movement sensitivity.

15. The method as recited in claim 11, where the handheld electronic device comprises a display located above a keyboard suitable for accommodating textual input to the handheld electronic device when the handheld electronic device is in an operable configuration.

16. The method of claim 11, where the at least one application is currently running is one of an email application program, a menu selection program, a messaging application, a camera program, and a picture viewing application.

17. The method of claim 11, where the screen comprises a length that is of a different dimension than a width of the screen, and where a vertical movement of the cursor corresponds to the length of the screen and a horizontal movement of the cursor corresponds to the width of the screen, where the amount of horizontal movement of the cursor and the amount of vertical movement of the cursor received from the at least one application are set where the cursor is configured to traverse the length of the screen and the width of the screen in an equal number of movements.

18. A handheld electronic device comprising:
a navigation tool;
a display, coupled to the navigation tool, on which a cursor moves in correspondence with motion detected on the navigation tool;
at least one application configured to present at least one screen on the display, the cursor being configured to be transitioned within the screen in response to the set of detected rotational movements; and
a control program configured to permit designation of
an amount of horizontal movement of the cursor to be induced on the display per a first set of detected movements of the navigation tool in a horizontal direction, and
an amount of vertical movement of the cursor to be induced on the display per a second set of detected movements of the navigation tool in a vertical direction, the control program being separate and distinct from the at least one application, and
the at least one application being further configured to set the amount of horizontal movement and the amount of vertical movement induced on the at least one screen of the display presented by the at least one application,
independent of the amount of horizontal movement and the amount of vertical movement designated through the control program, and
independent of an amount of horizontal movement and an amount of vertical movement designated through user defined settings,
for induced movement of the cursor within the at least one screen presented by the at least one application independent of induced movement of the cursor in other screens associated with other applications.

19. The handheld electronic device of claim 18, where the navigation tool comprises at least one of a trackball, a navigation pad, a joy stick, and a thumbwheel.

20. The handheld electronic device of claim 18, where the display is located above a keyboard suitable for accommodating textual input to the handheld electronic device when the handheld electronic device is in an operable configuration, the navigation tool being located essentially between the display and keyboard in the operable configuration.

21. The handheld electronic device of claim 18, wherein the at least one application sets the amount of horizontal movement with a horizontal movement multiplier and sets the amount of vertical movement with a vertical movement multiplier, where a value of the horizontal multiplier is two to five times a value of the vertical multiplier.

22. The handheld electronic device of claim 18, where the screen comprises a length that is of a different dimension than a width of the screen, and where a vertical movement of the cursor corresponds to the length of the screen and a horizontal movement of the cursor corresponds to the width of the screen, the at least one application setting the amount of horizontal movement of the cursor and the amount of vertical movement of the cursor where the cursor is configured to traverse the length of the screen and the width of the screen in an equal number of movements.

23. A method for designating sensitivity of movement on a display of a cursor in response to manipulation of a navigation tool on a handheld electronic device comprising:
   receiving, by a control program from at least one application that is currently operating and presenting a screen on a display,
      an amount of horizontal movement of a cursor to be induced on the screen, independent of induced movement of the cursor in other screens associated with other applications, per a first set of detected movements of a navigation tool in a horizontal direction, and
      an amount of vertical movement of the cursor to be induced on the screen, independent of induced movement of the cursor in other screens associated with other applications, per a second set of detected movements of the navigation tool in a vertical direction,
   the control program being separate and distinct from the at least one application; and
      the amount of horizontal movement and the amount of vertical movement received from the at least one application being set by the at least one application;
   independent of an amount of horizontal movement and an amount of vertical movement designated through the control program, and
   independent of an amount of horizontal movement and an amount of vertical movement designated through user defined settings; and
   adjusting, by the control program, a horizontal movement sensitivity of the cursor and a vertical movement sensitivity of the cursor for the screen in response to receiving the amount of horizontal movement of the cursor and the amount of vertical cursor movement from the at least one application,
   where the screen comprises a length that is of a different dimension than a width of the screen, and where a vertical movement of the cursor corresponds to the length of the screen and a horizontal movement of the cursor corresponds to the width of the screen, and
   where the amount of horizontal movement of the cursor and the amount of vertical movement of the cursor received from the at least one application are set by the at least one application where the cursor is configured to traverse the length of the screen and the width of the screen in an equal number of movements.

24. The method as recited in claim 23, where the navigation tool comprises at least one of a trackball, a navigation pad, a joy stick, and a thumbwheel.

25. The method of claim 23, further comprising, generating a sound in response to actuation of the navigation tool.

26. The method as recited in claim 23, where the handheld electronic device comprises a display located above a keyboard suitable for accommodating textual input to the handheld electronic device when handheld electronic device is in an operable configuration.

* * * * *